(12) United States Patent
Petersen

(10) Patent No.: US 6,436,471 B1
(45) Date of Patent: Aug. 20, 2002

(54) PLANT AND PROCESS FOR COATING A MULTI-SIDED MINERAL FIBER ELEMENT

(75) Inventor: Conny Petersen, Frederikssund (DK)

(73) Assignee: Rockwool International A/S (DK)

( * ) Notice: Subject to any disclaimer, the term of this patent is extended or adjusted under 35 U.S.C. 154(b) by 0 days.

(21) Appl. No.: 09/424,702

(22) PCT Filed: May 27, 1998

(86) PCT No.: PCT/DK98/00215

§ 371 (c)(1),
(2), (4) Date: Nov. 23, 1999

(87) PCT Pub. No.: WO98/54387

PCT Pub. Date: Dec. 3, 1998

(30) Foreign Application Priority Data

May 28, 1997 (DK) ................................................ 614/97

(51) Int. Cl.[7] ............................. B05D 1/26; B05D 1/36
(52) U.S. Cl. ....................... 427/209; 427/348; 427/422; 427/424; 118/314; 118/320; 118/322
(58) Field of Search .................. 427/348, 421, 427/422, 209, 424; 118/313, 314, 315, 316, 320, 322; 156/167, 176

(56) References Cited

U.S. PATENT DOCUMENTS 5,160,746 A * 11/1992 Dodge, II ...................... 427/7
5,501,872 A 3/1996 Allen et al.
5,614,264 A * 3/1997 Himes ........................ 427/424

FOREIGN PATENT DOCUMENTS

WO  9316874  9/1993

\* cited by examiner

Primary Examiner—Shrive P. Beck
Assistant Examiner—Kirsten A. Crockford
(74) Attorney, Agent, or Firm—Dickstein, Shapiro, Morin & Oshinsky, LLP.

(57) ABSTRACT

A plant and a process for coating a multi-sided mineral fiber base layer with a surface coating in the form of a fibrous non-woven fabric formed of a thermoplastic polymer material on at least part of at least two sides of the base layer to form a mineral fiber element, wherein the plant comprises two or more coating devices, means for melting a thermoplastic polymer material, means for supplying the polymer melt obtained to the coating devices, wherein each coating device comprises a number of dispensing units comprising a number of orifices, means for extruding the polymer melt obtained through the orifices and distributing the extruded polymer material on the surface of the mineral fiber base layer, and means for directing one or more high pressure gas streams closely past the orifices in order to elongate the extruded polymer material so as to form thin filaments and/or fibers, and wherein the coating devices are arranged in separate successive coating stations in such a manner that the coating of individual base layer sides are effected in separate steps.

11 Claims, 4 Drawing Sheets

PLANT AND PROCESS FOR COATING A MULTI-SIDED MINERAL FIBER ELEMENT

BACKGROUND OF THE INVENTION

The present invention relates to a plant for coating a multi-sided mineral fibre base layer with a surface coating in the form of a fibrous non-woven fabric formed of a thermoplastic polymer material on at least part of at least two sides of the base layer to form a mineral fibre element, wherein the plant comprises two or more coating devices, means for melting a thermoplastic polymer material, means for supplying the polymer melt obtained to the coating devices, wherein each coating device comprises a number of dispensing units comprising a number of orifices, means for extruding the polymer melt obtained through the orifices and distributing the extruded polymer material on the surface of the mineral fibre base layer, and means for directing one or more high pressure gas streams closely past the orifices in order to elongate the extruded polymer material so as to form thin filaments and/or fibres.

WO 93/16874 discloses a process and an apparatus for applying a coating in the form of a fibrous netting of a thermoplastic polymer material onto the surface of a mineral fibre material. The apparatus used may be a so-called melt blowing die apparatus or a hot melt spray nozzle apparatus.

U.S. Pat. No. 5,501,872 discloses a process and an apparatus for coating a six-sided fibrous batt, the process comprising the steps of passing the batt sequentially through three coating stations, which each comprise two co-operating melt blowing dies disposed so as to coat pairs of opposite batt surface sides. The melt blowing dies are operated discontinuously so as to be shut off while the batt is positioned between coating stations. The melt blowing dies of one coating station are slightly spaced in such a manner that they are in simultaneously operation a part of the time.

The prior art disclosed in U.S. Pat. No. 5,501,872 suffers from the drawback that the two high pressure gas streams ejected from the melt blowing dies of one coating station have opposite directions and hence will interfere with each other creating circumstances of substantial turbulence in a zone surrounding the batt. Such turbulence has a strongly adverse effect on the formation of the surface coating both with respect to the adhesion between the coating and the base layer and with respect to the quality of the coating fabric formed. Thus, the turbulence results in a coating fabric, which has reduced uniformity with respect to fibre/filament diameter and orientation.

The object of the invention is to provide a plant of the type defined in the preamble of claim 1, with which the above-discussed drawback may be avoided.

SUMMARY OF THE INVENTION

This object is achieved with the plant of the invention, which is characterized in that the coating devices are arranged in separate successive coating sections in such a manner that the coating of individual base layer sides are effected in separate steps.

The invention is based on the recognition that the technical problem of interfering gas streams may be solved by using coating sections designed to coat only one surface side of the base layer, since such a coating section will only generate one high pressure gas stream, and since such coating sections may be spaced in a manner sufficient to avoid any interfering of gas streams of adjacent coating devices.

Also, the plant of the invention presents a number of further advantages. Accordingly, a plant making use of coating sections designed to coat only one base layer side is much more flexible and suitable to be adapted to producing different products than the prior art plant. Thus, the sequence of the coating of the base layer sides to be coated may be selected completely freely and importantly, the plant of the invention has provided the possibility of arranging the horizontally orientated coating devices and the vertically orientated coating devices, respectively, on the same side of the base layer, and such an arrangement involves a number of additional advantages as explained in the following.

Firstly, the arranging of the horizontally orientated coating devices on the same side of the base layer makes control, monitoring and operation of the plant much more easy, since the operators of the plant need not cross the coating production line conveying the base layers in order to gain access to the coating devices, such crossing only being possible at a limited number of points along the production line, where a bridge or a passageway below an elevated section of the production line is provided. Moreover, when two coating production lines are disposed parallel to one another it is possible to provide a common zone between the two lines, from which both lines may be operated.

Secondly, the said arrangement of the coating devices reduces further the interference of the gas streams from adjacent coating devices, since the gas streams will have parallel flow directions.

Finally, providing the coating devices on the same side of the base layer makes it possible to make the plant completely independent of the dimensions of the mineral fibre element to be produced. In order to obtain a uniform coating having an acceptable adhesion to the base layer it is necessary to maintain the distance between the coating device and the base layer surface at a certain level. In the prior art plants, the position of the coating devices have to be adjusted, whenever the production is switched from one type of product to another, such an adjustment requiring a shut-down of the coating plant. This is very undesirable, since the plant for producing the mineral fibre base layer, which is placed up-stream of the coating plant, and which is operated continuously, cannot be shut down temporarily without substantial difficulties and costs.

This technical problem is solved by the present invention. Hence, by providing the horizontally orientated coating devices on the same side of the base layer and by turning the base layer between each coating device while keeping the base layer at one side of the supporting and conveying means, it is possible to make the plant independent of e.g. the width and length of a rectangular base layer. Likewise, by providing the vertically orientated coating devices below the base layer and by turning the base layer between the coating devices, it is possible to make the plant independent of the height of the base layer.

In the following a number of preferred embodiments of the plant of the invention is described.

A first preferred embodiment of the invention is characterized in that it comprises at least one horizontally orientated coating device placed on one side of the base layer and at least one horizontally orientated coating device placed on the opposite side of the base layer.

A second preferred embodiment of the invention is characterized in that it comprises at least two horizontally orientated coating devices placed on the same side of the base layer.

A third preferred embodiment of the invention is characterized in that it comprises four horizontally orientated coating devices and two vertically orientated coating devices. The latter two coating devices may be disposed below the base layer with an upward orientation. Alternatively, one vertically orientated coating device is disposed below the base layer with an upward orientation and the second is disposed above the base layer with a downward orientation.

In general, the coating devices are orientated in a direction perpendicular to the surface of the base layer to be coated.

A fourth preferred embodiment is characterized in that the coating sections are disposed in a straight-line relationship.

A fifth preferred embodiment of the invention is characterized in that the coating sections are disposed in such a manner that the movement direction of the base layer is changed, preferably by 90° one or more times.

A sixth preferred embodiment is characterized in that each coating section comprises means for supporting and conveying the base layer. The supporting and conveying means may have the form of any suitable transport means, such as rotatable rolls, e.g. a roller belt or a roller path, a conveyor belt or a conveyor path or a combination thereof. Preferably, the supporting and conveying means is rotatable rolls.

A seventh preferred embodiment of the invention is characterized in that it comprises intermediate conveying sections placed between the coating sections. Preferably, one or more of the intermediate conveying sections comprises means for turning the base layer, e.g. upside-down or by 90° in a horizontal plane. One or more of the intermediate conveying sections may also comprise means for moving the base layer in the transverse direction of the general direction of movement of the base layer in the plant. Such means may consist in a horizontal bed of parallel rolls, wherein the axes of the rolls are disposed at a non-right angle to the said general direction of movement. Also, the said means may consist in one or more displaceable rolls having vertical axes and protruding from the upper surface of the supporting and conveying means. The movement of such vertical rolls may be controlled by means of contact-free sensors, e.g. optical sensors or electromagnetic sensors. The intermediate conveying sections for moving the base layer in the transverse direction may be equipped with side supports for stopping the transverse movement.

An eighth preferred embodiment of the invention is characterized in that each coating section comprises a suction device, preferably a suction box, disposed vis-a-vis the coating device. Such a suction device serves mainly to remove excess polymer material, i.e. polymer fibres/filaments which are not deposited on the mineral fibre base layer, and to remove polymer vapours contained in the emitted high pressure gas streams.

A ninth preferred embodiment of the invention is characterized in that one or more of the coating sections comprises holder means for keeping the base layer in place. Preferably, the holder means are rolls, which abut on the upper side of the base layer. Alternatively, the base layer may be held in place by using a supporting and conveying means having the form of a horizontal bed of parallel rolls, wherein the axes of the rolls are disposed at a non-right angle to the general direction of movement of the base layer in the plant, the said bed being equipped with a side support. Also, the base layer may be held in place by using a supporting and conveying means having the form of a bed of parallel rolls, which inclines downward towards a coating device, the said inclined bed being equipped with a side support. When the base layer surface to be coated is placed on such an inclined bed of rolls, the coating device is disposed in a corresponding inclined position so as to be orientated in a direction perpendicular to the said surface.

The coating plant of the invention may be used in combination with one or more plants of the same type, the said plants e.g. being placed next to each other on the same level and/or on top of each other in two levels.

A tenth preferred embodiment of the invention is characterized in that the coating devices are melt blowing die apparatuses comprising an oblong polymer dispensing chamber, which via a pump is in liquid communication with the melting means and which at its distal end comprises a number of closely spaced orifices, two gas chambers located along the two side walls of the dispensing chamber and at the distal end of which a longitudinal slot is formed, and means for directing a high pressure gas stream through the said gas chambers and out through the slots.

An eleventh preferred embodiment of the invention is characterized in that the coating devices are hot melt spray nozzle apparatuses each comprising a number of individual spray nozzles, which via a pump are in liquid communication with the melting means, and which comprise means for directing one or more high pressure gas streams past the orifices of the nozzles.

A twelfth preferred embodiment is characterized in that the coating devices are spun bond apparatuses.

With respect to the structure and operation of "melt blowing die apparatuses" and "hot melt spray nozzle apparatuses", reference is made to U.S. Pat. No. 6,203,646, which is incorporated herein by reference. Spun-bond fibres of thermoplastic polymers and apparatuses for making them are disclosed in EP-B1-0,480,550, and in U.S. Pat. Nos. 3,692,618 and 5,213,881 which are incorporated herein by this reference.

The temperature of the polymer melt to be extruded and the temperature of the high pressure gas streams depend primarily on the type of polymer used. In general, it is desirable to keep the temperature of a polymer melt as low as possible while maintaining it flowable, since most polymers tend to decompose at high temperatures. On the other hand, the melt to be extruded should have a sufficiently low viscosity so as to be able to be drawn out by the high pressure gas streams.

The temperature of the polymer melt in the plant is conveniently controlled by setting the temperature of the dispensing unit, i.e. e.g. a melt blowing die or a hot melt spray nozzle, to a desired level selected with due consideration to the specific polymer used, preferably 180–240° C., and then adjusting the temperature of the polymer melt in the polymer melt supply means at the point of entry into the dispensing unit to a level of from +5% to –25%, more preferably from 0% to –10%, relative to that of the dispensing unit. Also, the temperature of the high pressure gas streams is controlled on the basis of the temperature of the dispensing unit, and preferably the former is adjusted to be from 0% to 15% of the latter, more preferably from 5% to 10%. Such temperature levels help to reduce the cooling of the polymer melt leaving the nozzles, the temperature of the polymer, melt approximately corresponding to that of the dispensing unit, and hence to facilitate the drawing out of the polymer strands extruded from the orifices.

The gas in the high pressure gas streams is preferably air.

The distance between the orifices of the coating device and the surface of the mineral fibre base layer is preferably from 50 mm to 150 mm, more preferably from 70 mm to 120 mm.

The surface weight of the non-woven fabric is preferably 2–50 g/m$^2$, more preferably 2–15 g/m$^2$, and most preferably from 4–10 g/m$^2$.

The present invention further relates to a process for coating a multi-sided mineral fibre base layer with a surface coating in the form of a fibrous non-woven fabric formed of a thermoplastic polymer material on at least part of at least two sides of the base layer to form a mineral fibre element, the process comprising the steps of melting a thermoplastic polymer material and supplying the polymer melt obtained to two or more coating devices, which each comprises a number of dispensing units comprising a number of orifices, extruding the polymer melt through the orifices to distribute the extruded polymer material on the surface of the base layer while directing one or more high pressure gas streams closely past the orifices in order to elongate the extruded polymer material so as to form thin filaments and/or fibres. The process is characterized in that the coating of individual base layer sides are effected in separate successive steps.

In connection with the present invention the expressions "horizontal orientation" and "vertical orientation" used in relation to a polymer melt dispensing unit mean that the dispensing unit is disposed in such a manner that the polymer material extruded from the said unit at the point of leaving the unit has a substantially horizontal direction and a substantially vertical direction, respectively.

In connection with the present invention the term "extruding the polymer melt through the orifices" means pressing out the polymer melt through the orifices by means of an extruder, a pump or another mechanical device or allowing the gravitation to make the polymer melt run through the orifices.

As used in the present invention the term "mineral fibres" includes rock fibres, glass fibres, slag fibres and mixtures thereof.

As used in the present invention the term "thermoplastic polymer material" means any natural or synthetic thermoplastic polymer, copolymer or polymer blend. A thermoplastic material is characterized by that it is solid or partially solid at room temperature or at temperature of use, that it melts when heated and that it solidifies or resumes a solid or partially solid form when cooled.

The term "thermoplastic polymer material" also includes such materials which are ordinarily referred to as "thermoplastic hot melt adhesives" or "hot melt adhesives" or simply "hot melts".

By way of examples thermoplastic polymer materials are polymers of ethylenically unsaturated monomers, such as polyethylene, polypropylene, polybutylenes, polystyrenes, poly(a-methyl styrene), polyvinyl chloride, polyvinyl acetate, polymethyl methacrylate, polyethyl acrylate, polyacrylonitrile, etc; copolymers of ethylenically unsaturated monomers, such as copolymers of ethylene and propylene, ethylene and styrene, polyvinyl acetate, styrene and maleic anhydride, styrene and methyl methacrylate, styrene and ethyl acrylate, styrene and acrylonitrile, methyl methacrylate and ethyl acrylate etc; polymers and copolymers of conjugated dienes, such as polybutadiene, polyisoprene and polychloroprene and polymers of bi- polyfunctional monomers, such as polyesters, polycarbonates, polyamides and polyepoxides.

Examples of natural thermoplastic polymer materials are wax and bitumen.

Particularly preferred thermoplastic polymer materials are polyesters, polyamides, polypropylene and polyvinyl acetate.

The thermoplastic polymer material as used in the invention may contain up to 30% by weight of additives.

The thermoplastic polymer material to be used in the plant of the invention should have such a low viscosity in its molten heated state so that it is capable of flowing freely through the dispensing unit and so that the extruded polymer material is capable of being drawn out readily by the high pressure gas streams.

The base layer used in the invention is made from Man-Made Vitreous Fibres (MMVF). The coated element produced by the plant of the invention may be used as thermal or fire insulation or protection, for noise reduction or regulation, or as a horticultural growing medium.

The base layer used in the invention may be in any form and typically it has the form of an endless web, a web, a mat, a sheet, a slab or a tube, e.g. a pipe insulation, such as a circular pipe section, i.e. a pipe insulation having an annular cross section and a longitudinal slit.

The invention will now be described in further detail with reference to the drawings.

DETAILED DESCRIPTION OF THE PREFERRED EMBODIMENTS

Figure 1:
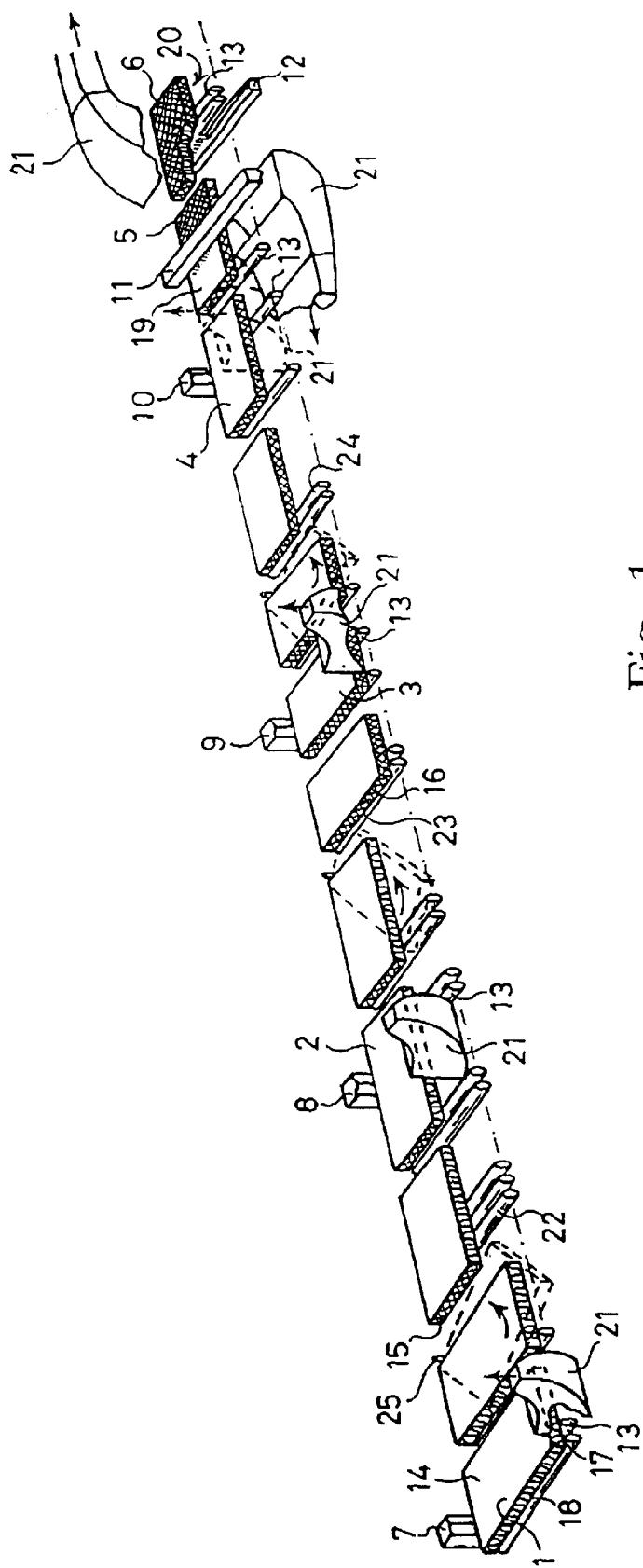
FIG. 1 shows a perspective view of a preferred embodiment of the plant of the invention.
Figure 2:
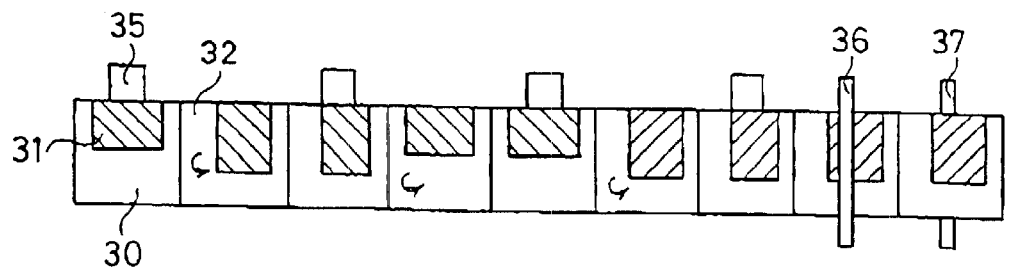
FIGS. 2–10 show diagrams of preferred embodiments of the plant of the invention.
Figure 3:
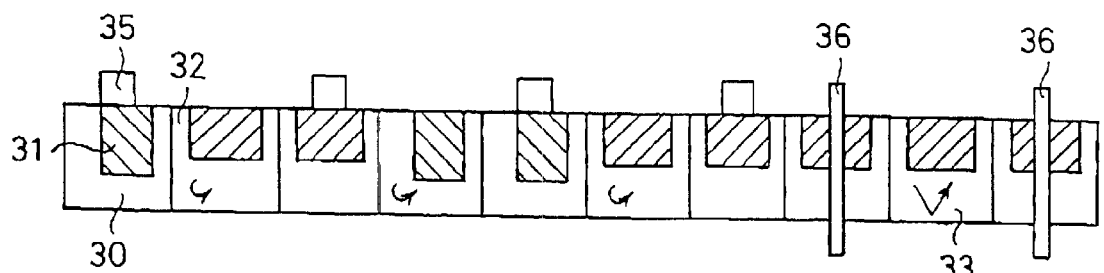
Figure 4:
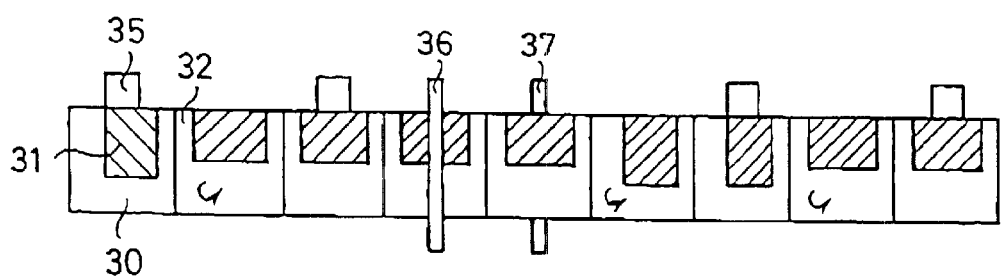
Figure 5:
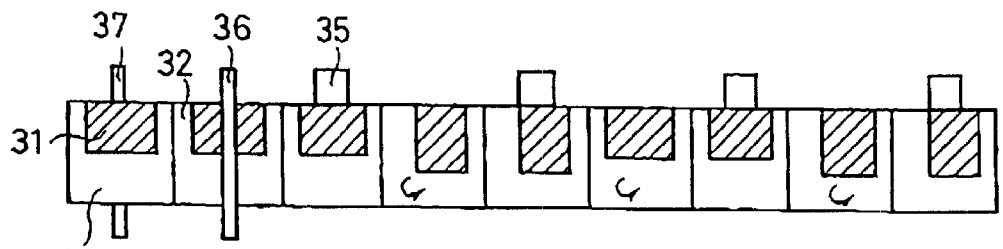
Figure 6:
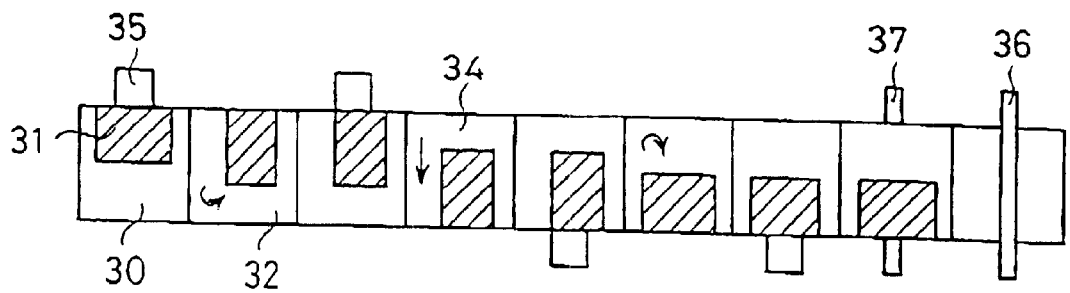
Figure 7:
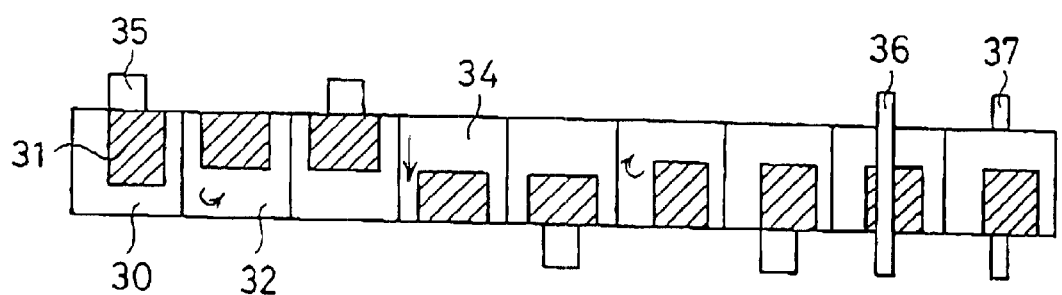

FIG. 1 shows a plant comprising six coating sections 1–6 disposed in a straight-line relationship, which each comprises a melt blowing die apparatus 7–12, a bed of rotatable rolls 13 for supporting a rectangular mineral fibre mat 14 having six sides 15–20, and a suction box 21. The apparatus 7–10 is disposed with a horizontal orientation on one side of the mat 14, and the apparatus 11 is disposed above the mat 14 with a vertical downward orientation, whereas the apparatus 12 is disposed below the mat 14 with a vertical upward orientation. The plant further comprises three intermediate beds of rotatable rolls 22–24 disposed between coating sections 1 and 2, 2 and 3, and 3 and 4, respectively. The beds 13 and the beds 22–24 together form straight-line roller path.

The plant is operated as follows: In coating section 1 the mat 14 is coated on its first short edge side surface 15, and then the mat 14 is conveyed onto the intermediate bed 22, where it is turned 90° in a horizontal plane by means of a rod 25 disposed vertically at one side of the bed 22 so as to protrude from the upper surface of the bed 22. Then, the mat 14 is conveyed onto the coating section 2, where it is coated on its first long edge side surface 16. On the intermediate bed 23 the mat is again turned 90° in the same manner as on the intermediate bed 22, and in coating section 3 the second short edge side surface 17 of the mat 14 is coated. On the intermediate bed 24 the mat 14 is yet again turned 90° and in coating section 4 the second long edge side surface of the mat 14 is coated. Finally, in coating sections 5 and 6 the upper side surface 19 and the lower side surface 20, respectively, are coated.

The plant is independent of the width and length of the mat 14, i.e. none of the horizontally orientated die apparatus 7–10 need to have their position adjusted when production is switched form one type of mat to another.

The coating sections 1–6 are spaced sufficiently to avoid any significant interference between high pressure gas streams ejected by adjacent coating devices. The horizontally orientated die apparatus 7–10 are disposed on the same side of the mat so as to create a uniform direction of gas flow from the said apparatus hence reducing gas turbulence to a minimum.

FIGS. 2–10 show a number of different configurations of a plant for coating a rectangular, six-sided mineral fibre mat, the plant comprising six coating sections and a number of intermediate conveying sections. Four of the coating sections comprise horizontally orientated coating devices and two of the coating sections comprise vertically orientated coating devices. In the figures, the following designations are used:

30: coating section.

31: mineral fibre mat.

32: intermediate conveying section for turning mat 90°.

33: intermediate conveying section for turning mat upside-down.

34: intermediate conveying section for displacing mat in transverse direction.

35: horizontally orientated coating device.

36: vertically, downwardly orientated coating device.

37: vertically upwardly orientated coating device.

38: intermediate conveying section for changing the general direction of mat movement by 90°.

Figure 8:
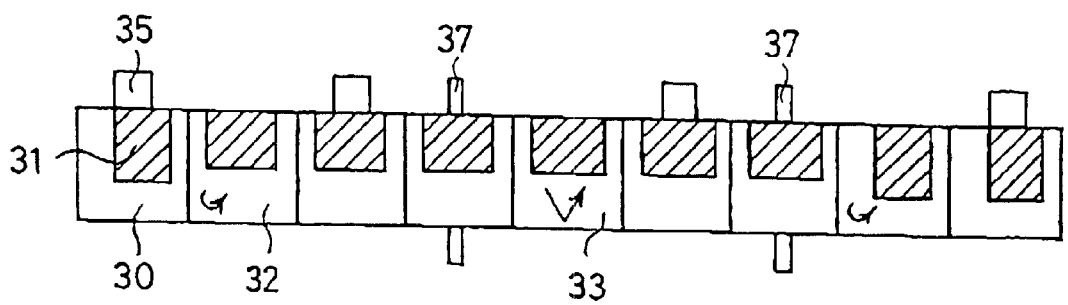
Figure 9:
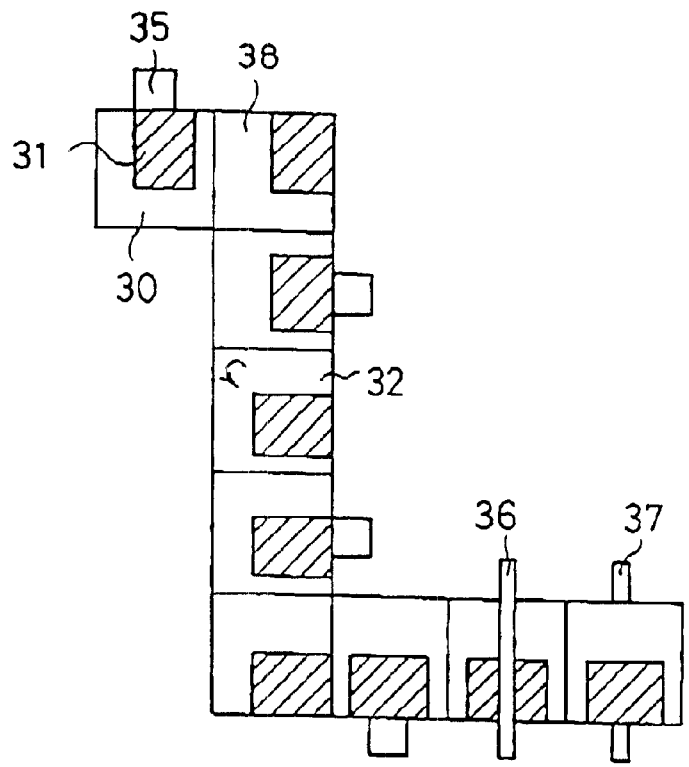
Figure 10:
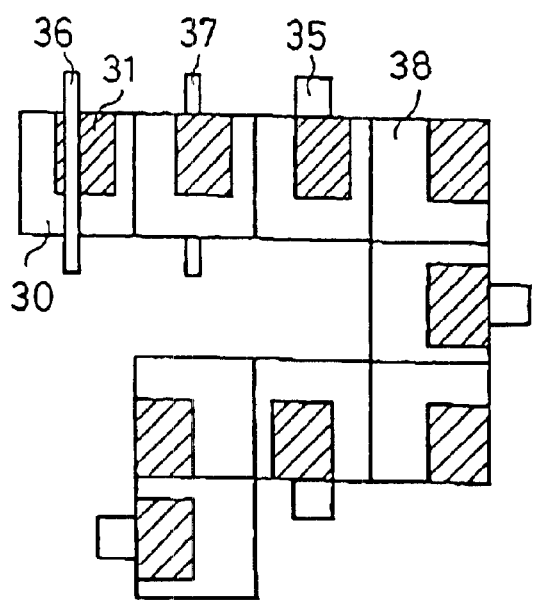

All plants illustrated in FIGS. 2–10 are independent of the width and length of the mat, i.e. none of the horizontally orientated coating devices need to have their position adjusted when production is switched from one type of mat to another. Furthermore, the plant illustrated in FIG. 8 is independent of the thickness of the mat.

The coating sections 30 are spaced sufficiently to avoid any significant interference between high pressure gas streams ejected by adjacent coating devices. The horizontally orientated coating devices of the plants illustrated in FIGS. 2,3,5 and 8 are disposed on the same side of the mat so as to create a uniform direction of gas flow from the said coating devices hence reducing gas turbulence to a minimum.

What is claimed is:

1. A process for coating a sequence of spaced apart multi-sided mineral fibre base layer mats carried on a conveyer with a surface coating in the form of a fibrous non-woven fabric formed of a thermoplastic polymer material on more than two surfaces of each mat to form a mineral fibre element, the process comprising melting the thermoplastic polymer material and supplying the polymer melt obtained to a plurality of coating stations arranged in sequence along the conveyer and including a final coating station, each coating station comprising a single coating device comprising a number of dispensing units comprising a number of orifices disposed so as to coat only a single surface of a mat, and at each coating station in the sequence extruding the polymer melt through the orifices of the coating device of that coating station to distribute the extruded polymer material on one surface only of a mat while directing one or more pressurized gas streams closely past the orifices thereof in order to elongate the extruded polymer material so as to form thin filaments or fibres or both, and after the polymer melt distribution on that surface is complete, moving the mat on the conveyer from that coating station to the next sequential coating station, and extruding the polymer melt through the orifices of the coating device of said next coating station to distribute the extruded polymer material on another one surface only of the mat while directing one or more pressurized gas streams closely past the orifices thereof in order to elongate the extruded polymer material so as to form thin filaments or fibres or both, and after the polymer melt distribution is completed at the final coating station, moving each coated mat on the conveyor away from the final coating station, wherein each coating device is spaced from any other coating device sufficiently so as to substantially avoid interfering of gas streams of adjacent coating devices.

2. A process according to claim 1 in which the base layer mat has six surfaces and the plurality of coating stations is six.

3. A process according to claim 1 in which the orientation of the base layer mat surfaces relative to a coating station in which it has been coated is changed during at least one movement of the base layer mat between coating stations.

4. A process according to claim 3 in which the orientation of the base layer mat surfaces relative to a coating station in which it has been coated is changed during at least three of the movements of the base layer mat between coating stations.

5. A process for coating a sequence of spaced apart multi-sided mineral fibre base layer mats carried on a conveyer with a surface coating in the form of a fibrous non-woven fabric formed of a thermoplastic polymer material on more than two surfaces of each mat to form a mineral fibre element, the process comprising melting the thermoplastic polymer material and supplying the polymer melt obtained to a plurality of coating stations arranged in sequence along the conveyer and including a final coating station, each coating station comprising a single coating device comprising a number of dispensing units comprising a number of orifices disposed so as to coat only a single surface of a mat, and at each coating station in the sequence extruding the polymer melt through the orifices of the coating device of that coating station to distribute the extruded polymer material on one surface only of a mat while directing one or more pressurized gas streams closely past the orifices thereof in order to elongate the extruded polymer material so as to form thin filaments or fibres or both, and after the polymer melt distribution on that surface is complete, moving the mat on the conveyer from that coating station to the next sequential coating station, and extruding the polymer melt through the orifices of the coating device of said next coating station to distribute the extruded polymer material on another one surface only of the mat while directing one or more pressurized gas streams closely past the orifices thereof in order to elongate the extruded polymer material so as to form thin filaments or fibres or both, and after the polymer melt distribution is completed at the final coating station, moving each coated mat on the conveyor away from the final coating station, wherein each coating device is spaced from any other coating device sufficiently so as to substantially avoid interfering of gas streams of adjacent coating devices, and wherein one pair of the coating sections is oriented vertically relative to the conveyor and the other coating sections are oriented horizontally relative to the conveyor, and the two coating devices in the pair of coating sections are oriented upward and downward, respectively.

6. A plant for coating a sequence of spaced apart multi-sided mineral fibre base layer mats carried on a conveyer with a surface coating in the form of a fibrous non-woven fabric formed of a thermoplastic polymer material on more than two sides of the base layer to form a mineral fibre element, the plant comprising a thermoplastic polymer material melt unit connected to first and second coating devices arranged in first and second spaced apart sequentially arranged coating stations, each coating station containing a single coating device, each of the first and second coating devices comprising a number of dispensing units comprising a number of orifices disposed so as to coat only a single surface of a mat and an extruder disposed to extrude polymer melt through the orifices of the coating device to distribute the extruded polymer material on a single surface only of the mat, a pressurized gas stream supply associated with each of the first and second coating devices and disposed to convey a pressurized gas stream closely past the orifices thereof in order to elongate the extruded polymer material so as to form thin filaments or fibres or both, a supporting conveyor arranged to support the mats and to move the mats from one coating station to the next sequential coating station and away from the last in the sequence of coating stations, a control arranged to cause the conveyor to move a mat from a coating station to the next sequential coating station or from the last in the sequence of coating stations away therefrom after the polymer melt distribution on that mat is complete, wherein each of said first and second coating devices is disposed so as to coat a different surface of the base layer mat in separate sequential coating sections such that the coating of the individual base layer surfaces is effected in separate steps and wherein each coating device is spaced apart from any other coating device sufficiently so as to substantially avoid interfering of gas streams of adjacent coating devices and the coating of one base layer surface is complete before the next surface of the base layer is in a coating position at the coating device of the next sequential coating station.

7. A plant according to claim 6 in which the coating sections are disposed in a straight-line relationship.

8. A plant according to claim 7 which includes a rotator adapted to change the orientation of the base layer mat relative to a coater before the next surface of the base layer mat is in a coating position at the coating device of the next sequential coating station.

9. A plant according to claim 7 in which there are six sequential coating stations.

10. A plant according to claim 9 having three rotators each of which is associated with a different one pair of adjacent straight-line disposed coating sections in said plurality of coating sections, each rotator adapted to change the orientation of the base layer mat relative to the coater of the first coating section of the pair before the next surface of the base layer mat is in a coating position at the coating device of the next sequential coating station of the pair of coating sections.

11. A plant according to claim 9 in which one pair of the coating sections is oriented vertically relative to the conveyor and the other coating sections are oriented horizontally relative to the conveyor, and the two coating devices in the pair of coating sections are oriented opposite to one another.

\* \* \* \* \*